United States Patent
Klees et al.

(10) Patent No.: US 7,165,467 B2
(45) Date of Patent: Jan. 23, 2007

(54) DISPOSABLE STERILIZABLE LINER FOR A LEVEL, PRESSURE OR TEMPERATURE MEASUREMENT INSTRUMENT

(75) Inventors: Daniel T. Klees, Greenwood, IN (US); Ola J. Wesstrom, Greenwood, IN (US); Scott A. Richardson, Franklin, IN (US)

(73) Assignee: Endress + Hauser Inc., Greenwood, IN (US)

( * ) Notice: Subject to any disclaimer, the term of this patent is extended or adjusted under 35 U.S.C. 154(b) by 85 days.

(21) Appl. No.: 11/078,347

(22) Filed: Mar. 14, 2005

(65) Prior Publication Data

US 2006/0201265 A1    Sep. 14, 2006

(51) Int. Cl.
*G01D 3/08* (2006.01)
*G01K 1/08* (2006.01)
*G01L 19/06* (2006.01)
*B65D 60/02* (2006.01)
*B65D 37/00* (2006.01)

(52) U.S. Cl. ............... 73/866.5; 73/706; 73/756; 374/209; 383/118; 428/99

(58) Field of Classification Search ............... 73/866.1, 73/866.5, 706, 756, 431; 374/209; 428/99; 383/118, 105, 127
See application file for complete search history.

(56) References Cited

U.S. PATENT DOCUMENTS

| 1,052,379 | A | * | 2/1913 | Ranken et al. ............. 383/127 |
| 2,981,108 | A | * | 4/1961 | Andersen et al. ........... 374/150 |
| 3,469,685 | A | * | 9/1969 | Baermann ................... 206/306 |
| 4,112,762 | A | * | 9/1978 | Turner et al. ............... 206/306 |
| 4,877,033 | A | * | 10/1989 | Seitz, Jr. ..................... 600/441 |

(Continued)

FOREIGN PATENT DOCUMENTS

EP    1281349 A1 *    2/2003

(Continued)

*Primary Examiner*—Thomas P. Noland
(74) *Attorney, Agent, or Firm*—Bacon & Thomas (57) ABSTRACT

In order to provide means for allowing a time and cost effective use of measurement instruments (1, 21, 22, 41, 55) in industrial applications where high standard of hygiene need to be fulfilled, a disposable sterilizable liner (15, 27, 28, 51, 67) for a level, pressure or temperature measurement instrument (1, 21, 22, 41, 55) for measuring level, pressure or temperature of a product (9) in a container (3), for use in combination with a disposable container liner (13) covering an interior of the container (3), is described, wherein the measurement instrument (15, 27, 28, 51, 67) comprises: a sensing element (5, 23, 47, 59) for sensing a physical quantity, and a process connector (7, 25, 43, 57) for mounting the sensing element (5, 23, 47, 59) on a counter connector (11, 29, 53) on the container (3), wherein the liner (15, 27, 28, 51, 67) for the measurement instrument (1, 21, 22, 41, 55) is one integral element made out of an elastic material has a shape that exactly follows outer contours of the sensing element (5, 23, 47, 59) and the process connector (7, 25, 43, 57), such that it forms a removable single use hygienic liner for closely covering all surfaces of the measurement instrument (1, 21, 22, 41, 55) exposed to the product (9) during measurement operation, and comprises a mounting section (17), which in operation is clamped between the process connector (7, 25, 43, 57) and the counter connector (11, 29, 53).

9 Claims, 5 Drawing Sheets

U.S. PATENT DOCUMENTS

| | | | |
|---|---|---|---|
| 6,451,012 B1 * | 9/2002 | Dobak, III | 606/24 |
| 6,725,726 B1 * | 4/2004 | Adolfs et al. | 73/756 |
| 2006/0106365 A1 * | 5/2006 | Lane et al. | 604/508 |
| 2006/0159155 A1 * | 7/2006 | Lantz et al. | 374/158 |

FOREIGN PATENT DOCUMENTS

| | | | |
|---|---|---|---|
| JP | 2001327490 A | * | 11/2001 |
| JP | 2003000597 A | * | 1/2003 |

* cited by examiner

DISPOSABLE STERILIZABLE LINER FOR A LEVEL, PRESSURE OR TEMPERATURE MEASUREMENT INSTRUMENT

BACKGROUND AND SUMMARY OF THE INVENTION

The present invention concerns a sterilizable disposable liner for a pressure, level or temperature measurement instrument for use in industrial applications requiring high standards of hygiene.

There is a wide range of measurement instruments on the market suitable for industrial applications. Measurement instruments comprise a sensing element for sensing a physical quantity of a product in a container and a process connector for mounting the sensing element on a counter connector on a container. In various branches of industry, the measurement data obtained by these devices is used to control complex industrial processes.

At present, pressure measurement instruments are on the market for measuring a pressure of a product in a container. They comprise a sensing element having a diaphragm, which during measurement operation is exposed to the pressure to be measured. A pressure dependent deflection of the diaphragm is either measured directly or is hydraulically transported to a pressure sensor via a pressure fluid.

Also various types of level measurement instruments are on the market. Level measurement instruments can be used for continuous level measurement as well as for determining whether a level of the product is above or below a predetermined level.

One group of level measurement instruments are capacitance level measurement instruments. In capacitance level measurement an electromagnetic signal, for example a radio frequency, is applied to a conductive probe extending into the container and a capacitance between a conductive probe and the container wall is determined. The capacity is a measure for the level of the product inside the container.

Other groups of level measurement instruments apply time of flight measurement techniques. Here a level of the product is determined based on the time of flight needed, for an electromagnetic signal to travel to the surface of the product and for its reflection to return. The electromagnetic signals are for example free radar waves or microwaves, which are send and received via a rod antenna extending into the container, or guided waves traveling along a probe, that extends into the container.

Temperature measurement instruments are available on the market. They usually comprise a probe comprising a temperature sensor, which is exposed to the temperature of the product in the container by insertion of the probe into the container.

Such level, pressure or temperature measurement instruments are for example sold by the applicant. They are on the market for example for measuring a pressure of a product in a pipe, tube or vessel, or a level in a vessel.

In some industries, for example in the Pharmaceutical Industry or in Biotechnology, very high standards of hygiene are required. These standards may vary slightly from country to country, but in general they address or validate, that any surfaces of the instruments, which may come in contact with the process can be effectively cleaned and/or sterilized. In the USA such standards are for example 3-A, ASME/BPE or EHEDG.

In addition, according to the FDA Current Good Manufacturing Practice (CGMP), materials that contact components, in-process materials or drug products shall not be reactive, additive, or absorbtive so as to alter the safety, identity, strength, quality or purity of a drug product beyond the official or other established requirements.

As a consequence all measurement instruments used in these industries must be designed in such a way that any parts in contact with the process can be cleaned and/or sterilized. Widely used methods are Cleaning in Place (CIP) or Sterilization in Place (SIP). Cleaning and/or sterilization can be carried out with automated or manual systems via various procedures on the site in a reliable and repeatable process that meets the stringent hygiene regulations demanded by biotechnology and pharmaceutical industries. Some systems include spray balls which can be permanently installed inside containers to apply liquid cleaners, water, detergents, steam or other cleaning or sterilization agents into closed containers.

The measurement instruments are mounted on process equipment, for example on a process connector on the container. In practice, the complete system, including the measurement instrument, is cleaned in place (CIP'd) and/or sterilized in place (SIP'd). The processing system is run for a period of time. Afterwards it is flushed, cleaned in place and/or sterilized in place before the next batch of product is run through the process. CIP and SIP assures, that there is no adulteration or contamination of the current product due to residual product left in the processing system during the previous product run.

CIP of a processing system can take hours to complete and sterilization can require another hour or even more time. During this time, the equipment and piping system can not be used otherwise. This time is lost for production every time cleaning or sterilization is required, for example due to a change of product or batch. This is very costly, especially when batch times or product cycles are short compared to the time required for cleaning and/or sterilization.

In addition, the chemicals used for CIP are expensive and often dangerous to handle and/or dispose of. Energy is required to heat the cleaning agents to the proper cleaning temperature, typically 120° F. to 160° F. Energy is required to heat the sterilization liquids or steam to a sterilization temperature, typically of 300° F. After the processing system has been cleaned and/or sterilized, additional energy may be required to cool the processing system down to an operating temperature.

There is a need in Industry, to reduce the time needed for cleaning and/or sterilizing dramatically.

At present disposable liners for industrial containers used in production processes are on the market, which can be sterilized prior to insertion in the container. The company HyClone, Logan, Utah, USA for example sells disposable sterilizable containers liner having a capacity ranging from 50 mL up to 1000 L or larger together with customized or standard tubing sets and fittings, for example quick connect, Luer Lock or Tri-Clamp. At the end of a production process, these container liners are removed from the container and are then disposed. A new container liner is inserted prior to the next production process. Since a new container liner can be inserted for every new production process, it is no longer necessary to clean and sterilize the container. The use of a new clean and sterile container liner ensures that the product in the container is exposed to the clean and sterile interior surface of the liner only.

In medical applications the need for cleaning and/or sterilization is overcome to a large extent by disposable parts. U.S. Pat. No. 6,725,726 for example, describes a disposable pressure dome for a reusable pressure transmitter. The pressure dome comprises an inlet channel, an outlet channel and a measurement channel and is removably coupled to the transducer. The inlet and the outlet channel are process connections. The entire dome including these process connections is disposed of after use.

In industrial application containers and measurement instruments are usually expensive parts, which cannot be replaced after every measurement cycle. Process connections of measurement instruments are quite often integral parts of the measurement instrument, which cannot be easily separated from the remaining parts of the instrument. They are standardized massive metal or stainless steel parts. In addition, a replacement of the process connections after every single use would increase the costs of production.

It is an object of the invention to provide means for allowing a time and cost effective use of measurement instruments in industrial applications where high standards of hygiene need to be fulfilled.

To this end the invention comprises a disposable sterilizable liner for a level, pressure or temperature measurement instrument for measuring level, pressure or temperature of a product in a container, for use in combination with a disposable container liner covering an interior of the container, wherein the measurement instrument comprises:
a sensing element for sensing a physical quantity, and
a process connector for mounting the sensing element on a counter connector on the container, and
wherein the liner for the measurement instrument
is one integral element made out of an elastic material,
has a shape that exactly follows outer contours of the sensing element and the process connector, such that it forms a removable single use hygienic liner for closely covering all surfaces of the measurement instrument exposed to the product during measurement operation, and
comprises a mounting section, which in operation is clamped between the process connector and the counter connector According to a preferred embodiment the sterilizable disposable liner has a thickness of less than one millimeter.

According to a preferred embodiment the disposable sterilizable liner is a foil out of a plastic or elastomeric material, in particular out of polypropylene, polyethylene, polytetrafluoroethylen (PTFE), latex or rubber.

According to another preferred embodiment, a seal for sealing a connection between the process connector and the counter connector is an integral part of the liner.

According to one embodiment, the sensing element comprises a measurement probe and the liner comprises a section for closely covering the probe.

According to another embodiment, the sensing element comprises a rod antenna and the liner comprises a section for closely covering the rod antenna.

According to another embodiment, the sensing element comprises a convoluted diaphragm, and the liner comprises a convoluted section for closely covering the convoluted diaphragm.

The invention further concerns a method of running consecutive production processes using the same level, pressure or temperature measurement instrument and sterilizable, disposable liners according to the invention, comprising the steps of mounting a previously sterilized disposable liner on the measurement instrument,
mounting the instrument on the container,
running a production process,
disposing of the used liner at the end of the production process, and
repeating these steps for every new production process.

The invention and further advantages are explained in more detail using the figures of the drawing, in which four exemplary embodiments are shown.

DETAILED DESCRIPTION OF THE DRAWINGS

Figure 1:
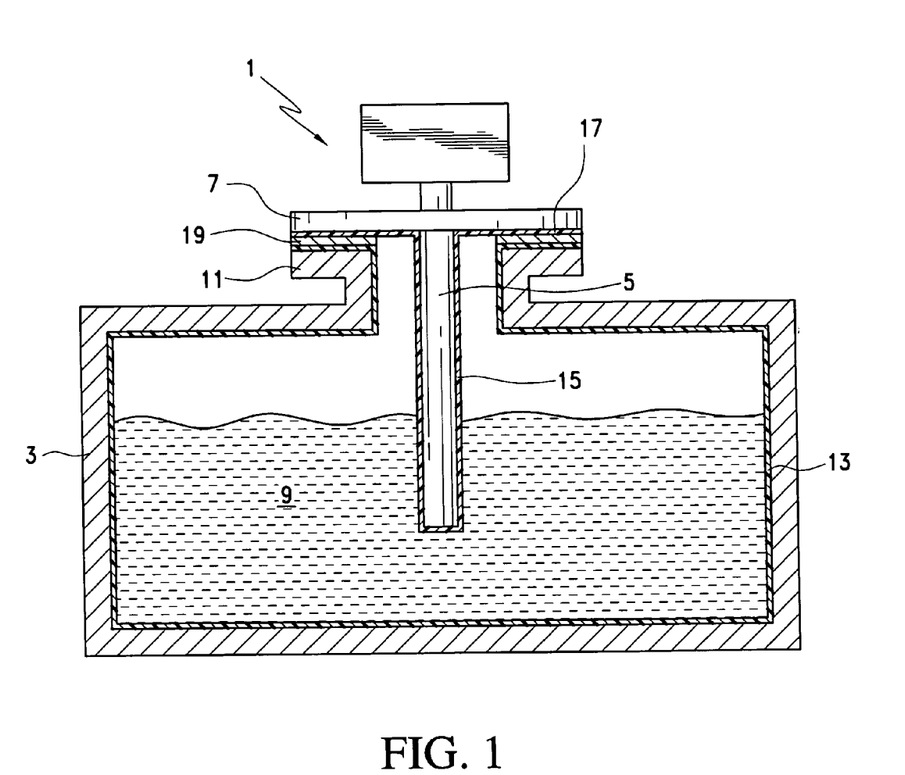
FIG. 1 shows a schematic diagram of a measurement instrument on a container.

FIG. 1 shows a schematic diagram of measurement instrument 1 on a container 3. The measurement instrument 1 is for example a level, pressure or temperature measurement instrument comprising a sensing element 5 and a process connector 7. It is used for measuring a physical quantity of a product 9 in the container 3. The sensing element 5 is mounted on the container 3 via the process connector 7 which is mounted on a mating counter connector 11 on an opening of the container 3. The container 3 is lined with a sterilized disposable container liner 13 covering all inner surfaces of the container 3 and the counter connector 11, which may be exposed to a product 9 inside the container 3. Container liners are available on the market. HyClone, Logan, Utah, USA for example sells container liners made out of advanced polymer films formulated to meet process requirements such as gamma-irradiation sterilization.

In industrial application it is often required to run consecutive batches or different product cycles using the same measurement equipment. In the past, level, pressure and temperature measurement instruments had to be cleaned and sterilized after every batch or product cycle whenever stringent hygiene was required in order to avoid contamination of the product or cross-contamination between different products. Cleaning and sterilization is time and cost intensive.

This problem is overcome by the invention by introducing disposable sterilizable liners 15 for level, pressure or temperature measurement instruments for use in combination with disposable container liners 13 covering an interior of the container 3. These liners 15 have a shape, that exactly follows the outer contours of the sensing element 5 and the process connector 7, such that it forms a removable single use hygienic liner for closely covering all surfaces of the measurement instrument exposed to the product 9 during measurement operation. They comprise a flat mounting section 17, which in operation is clamped between the process connector 7 and the counter connector 11. The disposable liner 15 is a thin foil formed of a sterilizable plastic or elastomer material, e.g. out of polypropylene. Other flexible materials, like for example polyethylene, polytetrafluoroethylen (PTFE), latex or rubber, can also be used. They can be produced using molding, spraying or dipping techniques. Preferably, the liner 15 is one integral element made out of an elastic material having a thickness of less than one millimeter, or even less than 0.5 millimeter. A thin liner 15 has the advantage, that it has very little effect on the measurement characteristics of the measurement instrument.

The use of sterilizable disposable liners 15 in combination with disposable container liners 13 makes it possible to run consecutive production processes using the same level, pressure or temperature measurement instrument 1 in quick timely succession. To this extent, the liners 15 are sterilized, for example in a gamma-chamber and then pulled over the measurement instrument 1. Once the instrument is equipped with the liner 15, it is mounted on the container 3. Upon mounting, the flat mounting section 17 is located between opposing surfaces of the process connector 7 and the counter connecter 11 and the compression force exerted by the connection between process connector 7 and the counter connector 11 acts on the flat mounting section 17 such that the liner is securely fixed. In a next step, a production process is run. At the end of the production process, the measurement instrument 1 is dismounted and the used liner 15 is disposed. The instrument 1 can be immediately equipped with a new sterile liner 15 and is thus immediately available for the next production process. Preferably, the replacement of the liner 15 and the processing of material takes place in a clean room, Class 10,000 or better. Cleaning and or sterilizing of the measurement instrument 1 is no longer necessary. The same applies for the container 3. Used container liners 13 are disposed of and replaced by new sterile container liners 13. This procedure is repeated for every new production process.

Industrial process connections comprise a seal 19, for example an O-Ring or a gasket, which is inserted between the process connector 7 of the measurement instrument 1 and the counter connector 11. In the embodiment shown in FIG. 1, this seal 19 is located between the flat mounting section 17 of the liner 15 and an opposing surface of the lined counter connector 11.

Preferably, the seal 19 for sealing the connection between the process connector 7 and the counter connector 11 is an integral part of the liner 15 for the measurement instrument 1. This has the advantage, that the seal 19 is always clean and sterile and cannot be forgotten.

Figure 2:
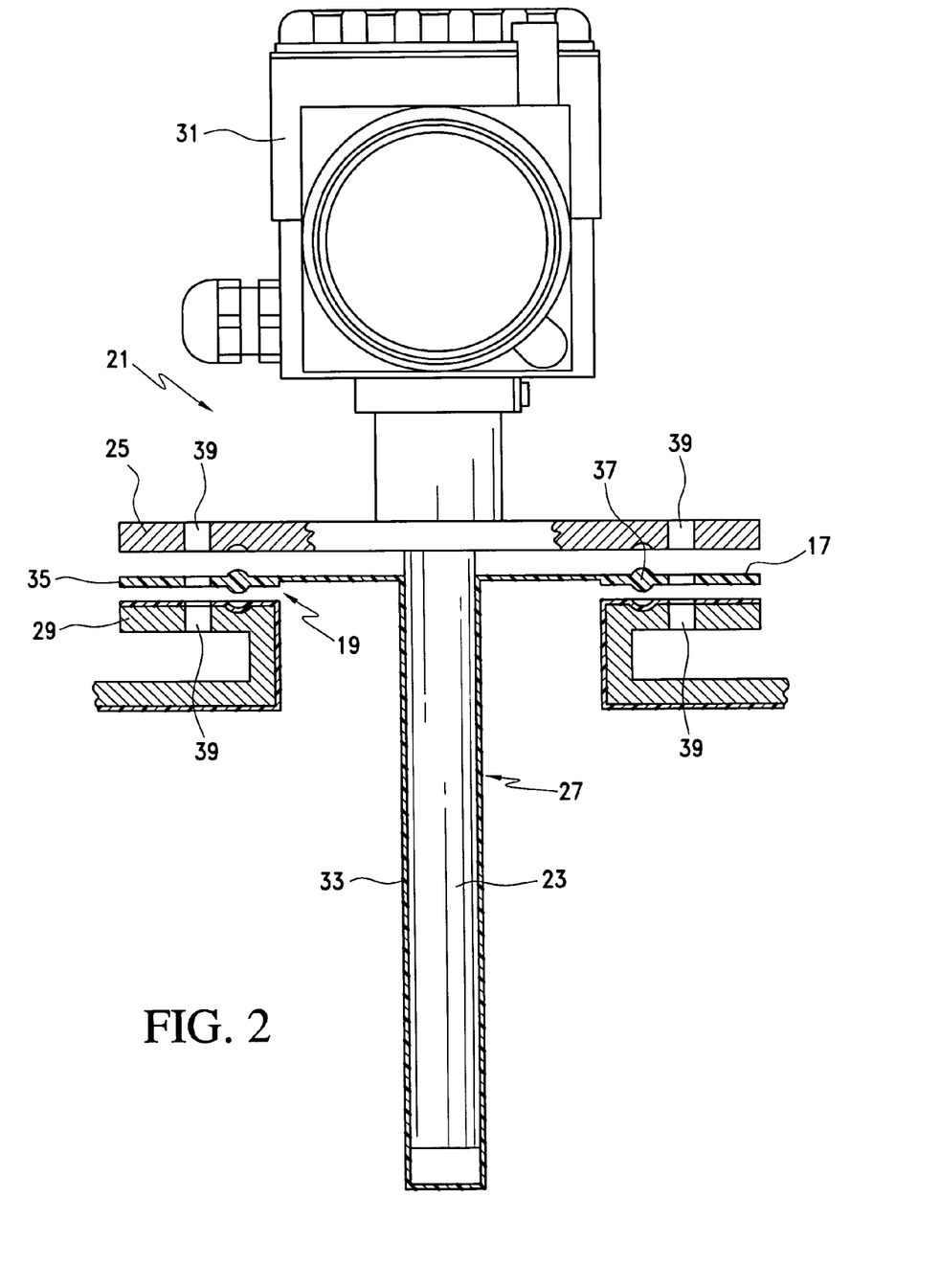
FIG. 2 shows an exploded view of a level measurement instrument comprising a probe and a process connector, a sterilizable, disposable liner for the measurement instrument and a lined mating counter connector.

FIG. 2 shows an exploded view of level measurement instrument 21 comprising a sensing element 23 and a process connector 25, a sterilizable, disposable liner 27 for the measurement instrument 21 and a lined mating counter connector 29 of the container 3. The level measurement instrument 21 is for example a capacitance level measurement instrument or a time of flight guided wave level measurement instrument, as described above. The sensing element 23 of the instrument 21 comprises a measurement probe, which during measurement operation extends into the container 3. The process connector 25 and the counter connector 29 are flat disk like flanges. The probe is held by the process connector 25. In addition, a housing 31 is mounted on the process connector 25 outside the container 3. The housing 31 contains for example sensor and measurement electronics as well as signal processing units, electrically connected to the sensing element 23 via a feed through in the process connector 25 not shown in FIG. 2.

The liner 27 comprises a section 33 for closely covering the probe. In the embodiment shown this section is a closed tubular hose, which is designed to be pulled over the probe. It further comprises the flat mounting section 17, which in operation is clamped between opposing flat surfaces of the process connector 25 and the counter connector 29. Preferably the seal 19 between these opposing surfaces is an integral part of the mounting section 17. To this extent an additional sealing layer 35 is provided on a surface of the mounting section 17 facing toward the counter connector 29. The sealing layer 35 is an integral part of the liner 27. In addition, a ring shaped seal 37 can be added onto the flat mounting section 17. The process connector 25 and the counter connector 29 comprise annular grooves on their opposing surfaces for holding the ring shaped seal 37. The ring shaped seal 37 enhances the sealing properties and prevents the seal 19 and the flat mounting section 17 of the liner 27 from sliding between the process connector 25 and the counter connector 29. Once the liner 27 is slid over the measurement instrument 21, the process connection is made for example by screwing bolts, not shown in FIG. 2, through opposing holes 39 in the process connector 25 and the counter connector 29.

Figure 3:
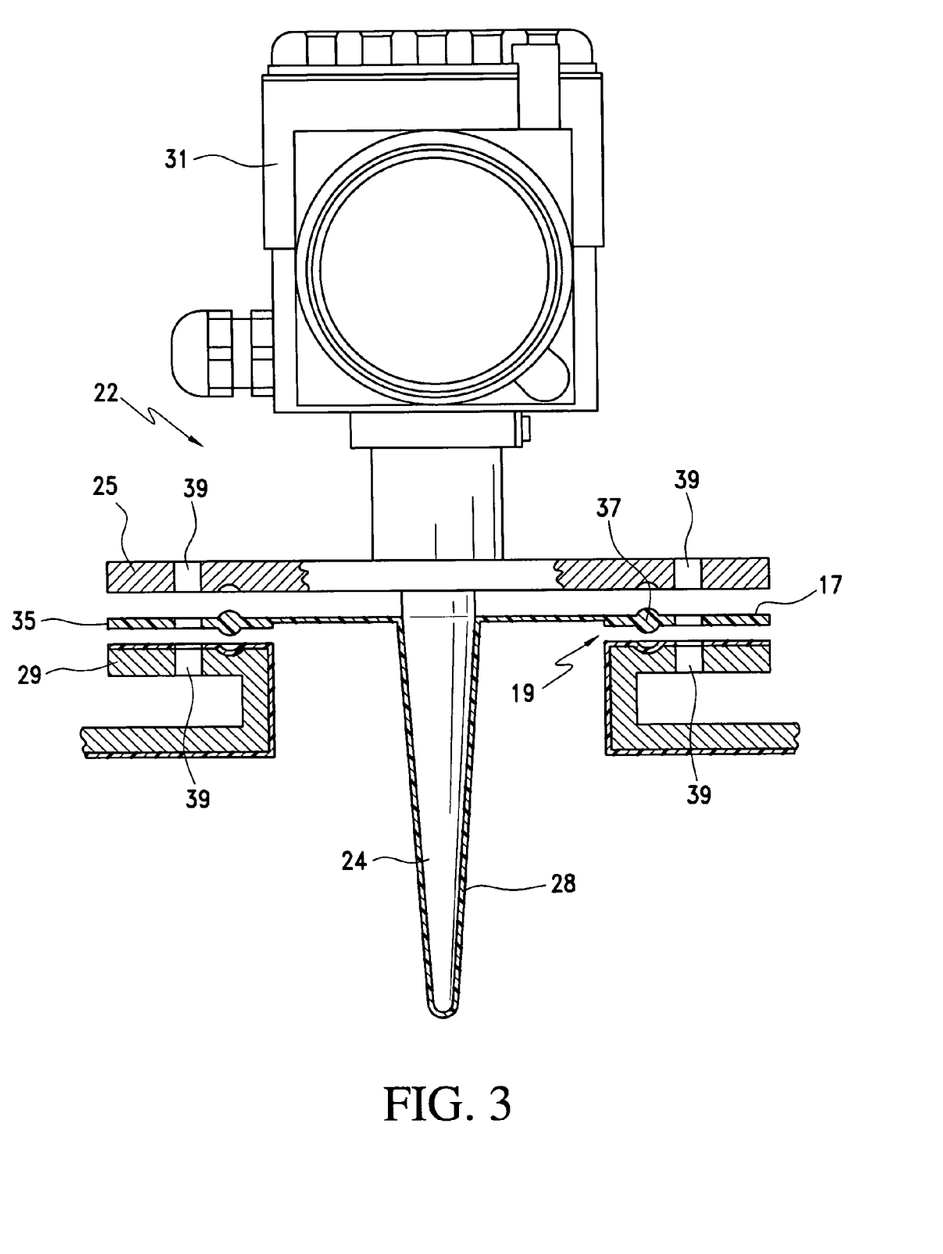
FIG. 3 shows an exploded view of a level measurement instrument comprising a rod antenna and a process connector, a sterilizable, disposable liner for the measurement instrument and a lined mating counter connector.

FIG. 3 shows an exploded view of another level measurement instrument, its process connector 25, its sterilizable, disposable liner 28 and the lined mating counter connector 29. The only difference between this embodiment, and the embodiment shown in FIG. 2 is, that the level measurement instrument is a time of flight radar or microwave level measurement having a sensing element comprising a rod antenna 24 for sending and/or receiving radar or microwaves. The antenna 24 is a conical rod having a tip, which in operation is pointing towards the product 9. It determines the level of the product 9 in the container based on the time of flight needed to travel from the antenna 24 to the surface of the product 9 and for its echo to return. Whereas the probe 23 shown in FIG. 2 during measurement operation extends into the container 3 below the surface of the product, the antenna 24 is located above the highest possible filling level. Its liner 28 comprises a section for closely covering the rod antenna 24.

Figure 4:
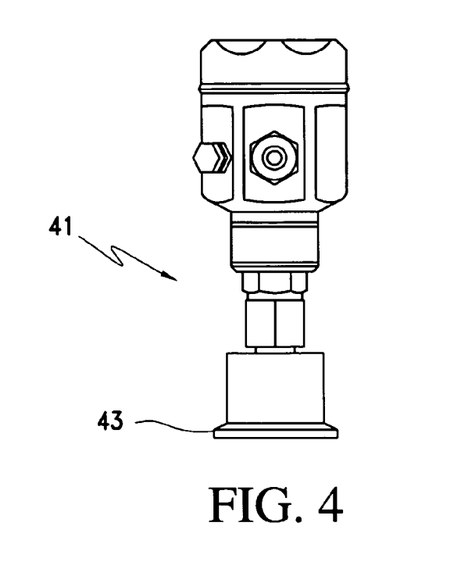
FIG. 4 shows a side view of a pressure measurement instrument.
Figure 5:
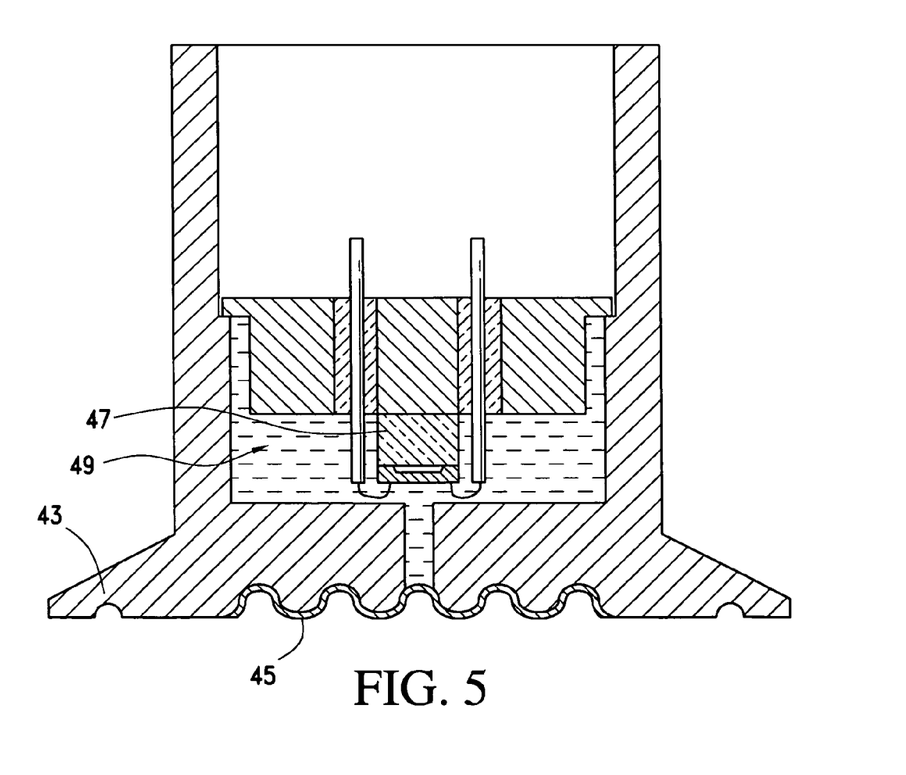
FIG. 5 shows a cross section of the process connector and the sensing element of the pressure measurement instrument shown in FIG. 3.
Figure 6:
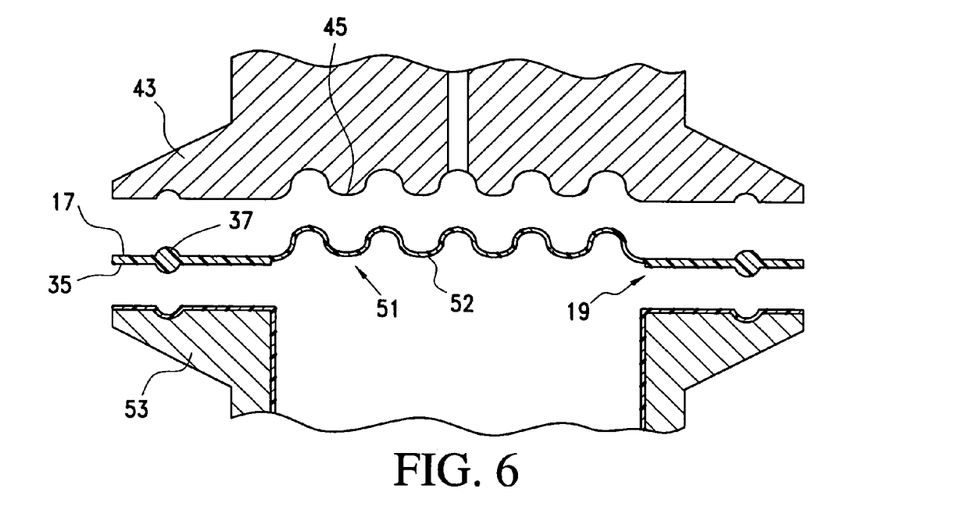
FIG. 6 shows an exploded view showing the pressure measurement instrument, its sterilizable, disposable liner and a lined mating counter connector.

In FIGS. 4 and 5 a pressure measurement instrument 41 is shown. It comprises a process connector 43 according to the Tri-Clamp standard and its sensing element 45 comprises a pressure sensitive diaphragm, which is flush mounted within the process connector 43. The invention is not limited to process connectors according to the Tri-Clamp standard. Other flush-mount process connections, for example Tuchenhagen Varivent (R) couplings or M44×1.25 fittings can be used. Any pressure exerted on the diaphragm is transferred to a pressure sensor 47 via a pressure transmission fluid 49. FIG. 6 shows an exploded view of the sensing element 45, the process connector 43, the liner 51 and a mating tri-clamp counter connector 53. Again, the liner 51 for the measurement instrument 41 is one integral element made out of an elastic material and has a shape that exactly follows outer contours of the sensing element 45 and the process connector 43, such that it forms a removable single use hygienic liner for closely covering all surfaces of the measurement instrument 41 exposed to the product during measurement operation.

In the embodiment shown, the diaphragm is convoluted and the liner 51 comprises a convoluted section 52 for closely covering the convolutions of the diaphragm.

It comprises a flat mounting section 17, which in operation is clamped between the process connector 43 and the counter connector 53. The mounting section 17 is identical to the on previously described and shown in FIG. 2. Again, the seal 19 between the opposing surfaces of the process connector 43 and the counter connector 53 is an integral part of the mounting section 17 comprising the sealing layer 35 and the ring shaped seal 37. The process connector 43 and the counter connector 53 comprise annular grooves on their opposing surfaces for holding the ring shaped seal 37.

Figures 7, 8:
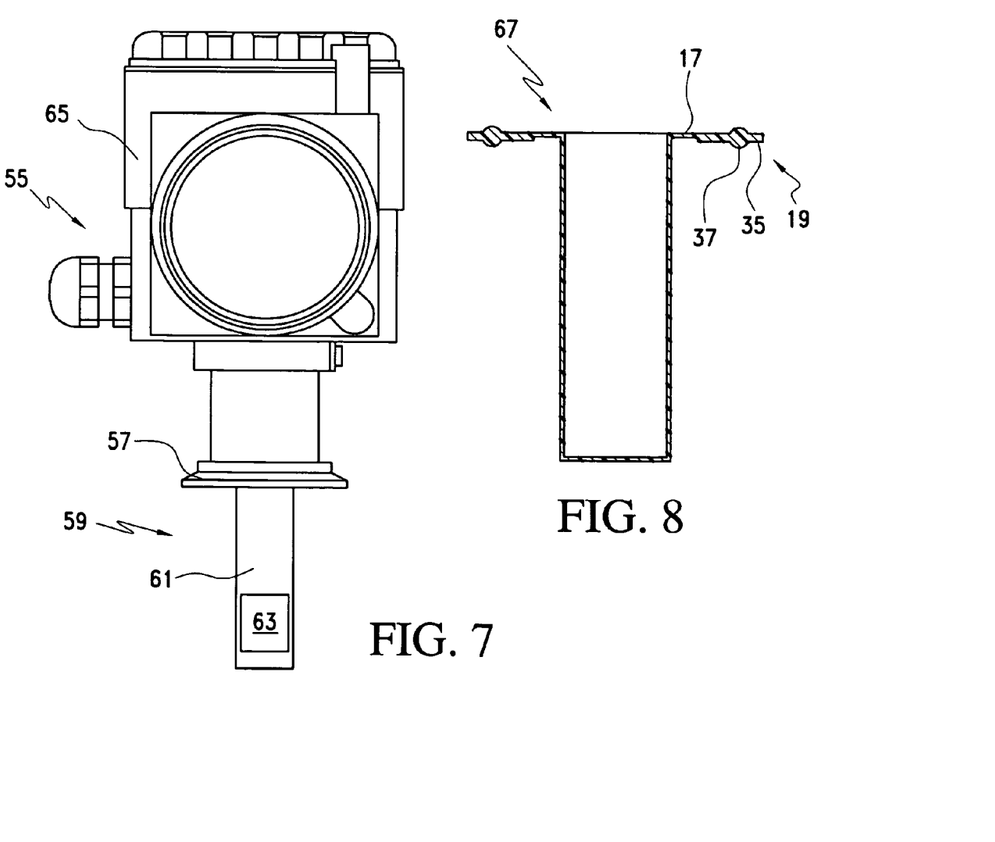
FIG. 7 shows a view of a temperature measurement instrument.
FIG. 8 shows a sterilizable disposable liner for the temperature measurement instrument shown in FIG. 6.

FIG. 7 shows a temperature measurement instrument 55 comprising a process connector 57 according to the tri-clamp standard and a sensing element 59. The sensing element 59 comprises a probe 61, that in operation extends into the container 3. A temperature sensor 63, schematically shown in FIG. 6, is located inside the probe 61. The measurement instrument 55 comprises a housing 65 for housing an electronic, which is mounted on the process connector 57. The electronic is connected to the temperature sensor 63 through the process connector 57.

FIG. 8 shows a sterilizable disposable liner 67 for the temperature measurement instrument 55. Again, the liner 67 is one integral element made out of an elastic material and has a shape that exactly follows outer contours of the sensing element 59 and the process connector 57, such that it forms a removable single use hygienic liner for closely covering all surfaces of the measurement instrument 55 exposed to the product 9 during measurement operation. It comprises a flat mounting section 17, which in operation is clamped between the process connector 57 and the mating counter connector, not shown in FIG. 6. The flat mounting section 17 is identical to the mounting sections 17 shown in FIGS. 2 and 6 including the integrated seal 19, comprising the sealing layer 35 and ring shaped seal 37 and therefore not described any further.

It is an advantage of the invention, that existing measurement instruments can be equipped with the sterilized disposable liners in order to avoid the necessity for cleaning and sterilizing and for validation and documentation of cleaning and sterilizing processes and procedures.

An additional advantage is, that measurement instruments can be used, which cannot withstand the high temperatures and process conditions involved with cleaning and sterilization procedures. They only need to withstand the temperatures and process conditions of the measurement application.

Liners according to the invention make it possible to use compact measurement instruments, since it is no longer necessary to separate the electronics from the measurement instrument during cleaning and/or sterilization procedures. Any damages which might occur during cleaning and sterilization process are avoided.

Also it is not necessary, to dismantle the measurement instrument itself, for example for cleaning recesses on the instrument. After use the entire instrument is taken out of the container and only the liner needs to be replaced.

Liners formed out of corrosion-resistant material protect all surfaces of the measurement instrument, which are covered by the liner. This protection makes it possible to use less expensive lesser grade materials, for example stainless steel, within the measurement instrument in places where previously for example special alloys had to be used.

Using sterilizable disposable liners for measurement instruments allows for fast and cost-effective product changeovers. Time and labor spent to dismantle, clean and re-sterilize stainless steel products are eliminated and a need for documentation of cleaning and cleaning validation procedures can be significantly reduced. Thus the invention reduces operating costs and shortens the time between batch cycles.

What is claimed is:

1. Disposable sterilizable liner (15, 27, 28, 51, 67) for a level, pressure or temperature measurement instrument (1, 21, 22, 41, 55) for measuring level, pressure or temperature of a product (9) in a container (3), for use in combination with a disposable container liner (13) covering an interior of the container (3),
   wherein the measurement instrument (15, 27, 28, 51, 67) comprises:
      a sensing element (5, 23, 47, 59) for sensing a physical quantity, and
      a process connector (7, 25, 43, 57) for mounting the sensing element (5, 23, 47, 59) on a counter connector (11, 29, 53) on the container (3),
   wherein the liner (15, 27, 28, 51, 67) for the measurement instrument (1, 21, 22, 41, 55)
      is one integral element made out of an elastic material
      has a shape that exactly follows outer contours of the sensing element (5, 23, 47, 59) and the process connector (7, 25, 43, 57), such that it forms a removable single use hygienic liner for closely covering all surfaces of the measurement instrument (1, 21, 22, 41, 55) exposed to the product (9) during measurement operation, and
      comprises a mounting section (17), which in operation is clamped between the process connector (7, 25, 43, 57) and the counter connector (11, 29, 53).

2. Disposable sterilizable liner according to claim 1, wherein the sterile disposable liner (15, 27, 28, 51, 67) has a thickness of less than one millimeter.

3. Disposable sterilizable liner according to claim 1, wherein the sterile disposable liner (15, 27, 28, 51, 67) is a foil out of a plastic or elastomeric material.

4. Disposable sterilizable liner according to claim 1, wherein the sterile disposable liner (15, 27, 28, 51, 67) is made out of polypropylene, polyethylene, polytetrafluoroethylen (PTFE), latex or rubber.

5. Disposable sterilizable liner according to claim 1, wherein a seal (19) for sealing a connection between the process connector (7, 25, 43, 57) and the counter connector (11, 29, 53) is an integral part of the liner (15, 27, 28, 51, 67).

6. Disposable sterilizable liner according to claim 1, wherein
   the sensing element (23, 59) comprises a measurement probe (61) and
   the liner (27, 67) comprises a section for closely covering the probe (61).

7. Disposable sterilizable liner according to claim 1, wherein
   the sensing element comprises a rod antenna (24) and
   the liner (28) comprises a section for closely covering the rod antenna (24).

8. Disposable sterilizable liner according to claim 1, wherein
   the sensing element comprises a convoluted diaphragm (45), and
   the liner (51) comprises a convoluted section (52) for closely covering the convoluted diaphragm (45).

9. Method of running consecutive production processes using the same level, pressure or temperature measurement instrument (1, 21, 22, 41, 55) and sterilizable, disposable liners (15, 27, 28, 51, 67) according to one of the previous claims, comprising the steps of mounting a previously sterilized disposable liner (15, 27, 28, 51, 67) on the measurement instrument (1, 21, 22, 41, 55), mounting the instrument (1, 21, 22, 41, 55) on the container (3), running a production process, disposing of the used liner (15, 27, 28, 51, 67) at the end of the production process, and repeating these steps for every new production process.

* * * * *